United States Patent
Palazzolo et al.

(10) Patent No.: US 8,592,038 B2
(45) Date of Patent: Nov. 26, 2013

(54) MULTILAYER DECORATIVE COATING COMPRISING A TWO-COMPONENT PAINT AND A PROTECTIVE RESIN

(75) Inventors: Rocco Palazzolo, Paris (FR); Moktar Mejladi, Cepoy (FR)

(73) Assignees: Rocco Palazzolo, Paris (FR); Moktar Mejladi, Cepoy (FR)

( * ) Notice: Subject to any disclaimer, the term of this patent is extended or adjusted under 35 U.S.C. 154(b) by 488 days.

(21) Appl. No.: 12/269,381

(22) Filed: Nov. 12, 2008

(65) Prior Publication Data
US 2009/0123763 A1 May 14, 2009

(30) Foreign Application Priority Data
Nov. 13, 2007 (FR) ..................... 07 07965

(51) Int. Cl.
*B32B 27/38* (2006.01)
*B05D 5/12* (2006.01)
*B25D 5/00* (2006.01)
*C08G 59/50* (2006.01)

(52) U.S. Cl.
USPC ........... 428/413; 427/97.6; 427/256; 523/400

(58) Field of Classification Search
None
See application file for complete search history.

(56) References Cited

U.S. PATENT DOCUMENTS

| | | | |
|---|---|---|---|
| 4,403,003 A | 9/1983 | Backhouse | |
| 4,508,763 A | 4/1985 | Shemenski | |
| 5,744,240 A * | 4/1998 | Lane et al. | 428/411.1 |
| 5,756,566 A * | 5/1998 | Laura | 524/186 |
| 5,977,286 A * | 11/1999 | Marten et al. | 528/120 |
| 6,248,204 B1 * | 6/2001 | Schuft | 156/305 |
| 6,537,670 B1 * | 3/2003 | Sassi | 428/412 |
| 2004/0156997 A1* | 8/2004 | Burkhart et al. | 427/402 |
| 2004/0186242 A1 | 9/2004 | Bartlett et al. | |
| 2006/0210511 A1* | 9/2006 | Stone et al. | 424/70.13 |
| 2008/0193661 A1 | 8/2008 | Palazzolo et al. | |

FOREIGN PATENT DOCUMENTS

| | | |
|---|---|---|
| EP | 1480166 | 10/2007 |
| GB | 956128 | 4/1964 |
| JP | 2006035828 | * 2/2006 |

OTHER PUBLICATIONS

DOW—DGEBPA Product Information, http://www.dow.com/productsafety/finder/bisphenol.htm Retrieved on Jun. 2, 2011.*
DOW—D.E.R. 331 Product Information http://msdssearch.dow.com/PublishedLiteratureDOWCOM/dh_01e8/0901b803801e8ef7.pdf?filepath=epoxy/pdfs/noreg/296-01408.pdf&fromPage=GetDoc Retrieved on Jun. 2, 2011.*
Thomas, Ellen; Sheet Silicate; http://ethomas.web.wesleyan.edu/ees123/sheet04.htm ; Sep. 12, 2006.*
R.A. Pearson—Elsevier; Applied Polymer Science, 2000, p. 204.*

(Continued)

Primary Examiner — Callie Shosho
Assistant Examiner — Coris Fung
(74) Attorney, Agent, or Firm — Lowe Hauptman & Ham, LLP

(57) ABSTRACT

The invention relates to a decorative coating having at least one layer of two-component paint and one protective resin surface layer. The resin is translucent or transparent and the two-component paint has at least one first component of prepolymer type based on bisphenol and epichlorohydrin and at least one second component of polyamine type. Another subject of the invention is the use of such a coating for covering surfaces such as a floor or a worktop or a sink or sanitary ware of wash basin, shower cubicle, etc. type.

21 Claims, 1 Drawing Sheet

(56) References Cited

OTHER PUBLICATIONS

Wiley-VCH—Paints, Coatings, and Solvents p. 75; p. 369-371.*
Ariga et al, JP 2006-035828 machine Translation, Feb. 9, 2006.*
Dictionary.com: World English Dictionary—"Paint". http://dictionary.reference.com/browse/paint . Retreived on Dec. 8, 2011.*
Database WPI Week 198625, Derwent Publications Ltd., London, GB; AN 1986-157253, XP002483475 & ES 8 603 297 (Vera A G), Apr. 16, 1986.
Database WPI Week 200614, Derwent Publications, Ltd., London, GB; AN 2006-130642, XP002483476 & JP 2006 035828 (Dainippon Ink & Chem Inc) Feb. 9, 2006.

\* cited by examiner

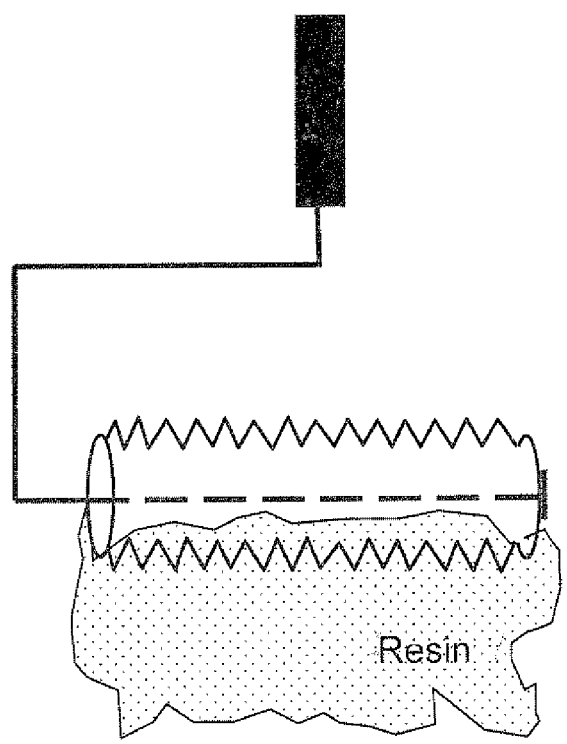

MULTILAYER DECORATIVE COATING COMPRISING A TWO-COMPONENT PAINT AND A PROTECTIVE RESIN

RELATED APPLICATIONS

The present application is based on, and claims priority from, French Application Number 07 07965, filed Nov. 13, 2007, the disclosure of which is hereby incorporated by reference herein in its entirety.

FIELD OF THE INVENTION

The field of the invention is that of surface coatings and notably coatings for surfaces exposed to stresses of any type, for example of the following types: heavy load (for a floor) or else large temperature rise (for a kitchen worktop) or else attack by acid cleaning products.

BACKGROUND OF THE INVENTION

To date there are numerous classes of very resistant surface coatings but these coatings generally require relatively heavy-duty logistics and when it is advisable to change them due to degradation or due to a change of decoration, the latter operation proves equally tedious.

Thus, today, when a user seeks to change a decorative coating on the floor, for example of the tiling type, usually the latter is removed and then relatively heavy work must be undertaken in order to lay a new type of tiled floor. It is the same when a user desires to change a kitchen worktop coupled with the tiling present around it.

While the passion of the public for redecoration work does not cease, it is increasingly advisable to find solutions that facilitate this type of work for users and most particularly for amateur users.

It has already been proposed, regarding flooring, to use mortars constituted of artificial agglomerates of mineral or synthetic grains, notably quartz grains, combined in a resin, notably an epoxide or polyurethane resin.

Such coatings may typically be manufactured from quartz grains known as "extra-siliceous" quartz grains obtained from purified sand. After their manufacture, these coatings are poured and spread on the floor using tools.

Thus coatings are obtained that can advantageously replace other types of carpet- or tiling-type coatings.

Nevertheless such coatings have the drawback of requiring, in order to lay them, a manufacturing process that is both long and inconvenient.

To solve this type of problem, it has been envisaged to provide this type of coating in the form of hard or semi-rigid slabs. Such slabs are nevertheless not completely satisfactory in so far as they remain brittle and need to be heated at the moment they are laid in order to be able to marry up various surface inhomogeneities.

SUMMARY OF THE INVENTION

In this context, the present invention provides an easy-to-use solution comprising the advantage of combining aspects of decoration with ease of use.

More precisely, the present invention provides a novel type of decorative coating characterized in that it comprises at least one layer of two-component paint and one protective resin surface layer, said resin being translucent or transparent and the two-component paint comprising at least one first component of prepolymer type based on bisphenol and epichlorohydrin and at least one second component of polyamine type.

The coating of the invention thus combines the advantages linked to a resistant two-component paint that provides the decorative effects and those of a protective resin encapsulating the decorative paint.

It may also advantageously cover any old coating providing a new decoration without removing the old coating.

According to one variant of the invention, the protective resin comprises inclusions that reinforce the decorative appearance conferred by the paint layer.

According to one variant of the invention, these inclusions are of flake type, or are micro-objects or else luminescent or phosphorescent particles.

According to one variant of the invention, the coating also comprises an intermediate layer of paint, which may advantageously be a paint of acrylic type.

Advantageously in this case, the two-component paint provides both an adhesion layer and a base which may be clear on which it is possible to produce decorations of the marbled decoration type.

According to one variant of the invention, the two-component paint comprises at least one first component of prepolymer type based on bisphenol and epichlorohydrin and at least one second component of polyamine and polyol epoxy resin.

According to one variant of the invention, the two-component paint also comprises a solvent of 3-butoxy-2-propanol type.

According to one variant of the invention, the two-component paint also comprises a solvent of 1-methoxy-2-propanol type.

According to one variant of the invention, the two-component paint also comprises mineral fillers of titanium dioxide type and/or of mica type and/or of barium sulphate type and/or of talc type and/or of alkali metal silicate type, making it possible to reinforce said paint and also rendering it resistant to acid attacks due to conventional cleaning products.

Advantageously, the two-component paint is a water-based paint, enabling decorative effects similar to those of acrylic water-based paints.

According to one variant of the invention, the two-component paint comprises colouring pigments and the following compounds:
  bisphenol-A-epichlorohydrin: 10 to 20%;
  bisphenol-F-epichlorohydrin: 2.5 to 7.5%;
  polyamine and polyol resin: 10 to 20%;
  3-butoxy-2-propanol: 0.1 to 5%;
  1-methoxy-2-propanol: 0.1 to 5%;
  titanium dioxide: 15 to 25%;
  alkali metal silicate: 2.5 to 7.5%;
  mica: 2.5 to 7.5%;
  barium sulphate: 15 to 25%;
  talc: 2.5 to 7.5%; and
  water: 15 to 25%.

According to one variant of the invention, the protective resin is a two-component resin comprising at least one first component of prepolymer type based on bisphenol and epichlorohydrin and at least one second component of trimethylcyclohexylamine type.

According to one variant of the invention, the prepolymer also comprises an alkyl (C12-C14) glycidyl ether, of oxirane type:

According to one variant of the invention, the first component of the protective resin also comprises a solvent of 3-butoxy-2-propanol type.

According to one variant of the invention, the second component of the protective resin also comprises a solvent of benzyl alcohol type.

According to one variant of the invention, the protective resin also comprises an anti-foaming agent.

According to one variant of the invention, the protective resin corresponds to the following chemical formula:
bisphenol-A-epichlorohydrin: 10 to 20%;
3-aminomethyl-3,5,5-trimethylcyclohexylamine: 5 to 10%;
alkyl (C12-C14) glycidyl ether: 10 to 20%;
3-butoxy-2-propanol: 10 to 20%;
benzyl alcohol: 15 to 25%; and
pine oil: 0.1 to 5%, making it possible to obtain a resin thickness of the order of 400 microns.

According to one variant of the invention, the protective resin corresponds to the following chemical formula:
bisphenol-A-epichlorohydrin: 45 to 60%;
3-aminomethyl-3,5,5-trimethylcyclohexylamine: 5 to 10%;
alkyl (C12-C14) glycidyl ether: 15 to 25%;
3-butoxy-2-propanol: 1 to 5%;
benzyl alcohol: 15 to 25%;
pine oil: 0 to 0.05%, making it possible to obtain greater resin thicknesses, typically of the order of 1000 microns, and compatible with the introduction of particle inclusions.

According to one variant of the invention, the protective resin also comprises quartz particles making it possible to reinforce the mechanical strength.

According to one variant of the invention, the resin also comprises satinizing or mattifying particles, which may advantageously be wax particles.

According to one variant of the invention, the two-component paint layer has a thickness of the order of about fifty microns to around five hundred microns.

According to one variant of the invention, when the coating is intended to cover a floor, the protective resin has a thickness of around 400 microns.

Another subject of the invention is a process for producing a decorative coating according to the invention that makes it possible to cover a horizontal surface, characterized in that it comprises the following steps:
the deposition of a layer of two-component paint on said surface;
the deposition of a layer of protective resin on the layer of two-component paint; and
the adjustment of the thickness of the layer of protective resin using a calender roller.

According to one variant of the invention, the calender roller comprises a helical structure of axial symmetry, having a thread, the dimensions of which are adjusted in order to control the thickness of the resin layer.

A further subject of the invention is the use of the decorative coating according to the invention for covering, for example, a floor or a worktop or a sink or sanitary ware of wash basin, bath or shower cubicle type, or else any other type of surface, such as electrical household appliance surfaces, which it may be desired to coat and decorate.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 is an illustration of an example of a roller that makes it possible to spread the protective resin of the coating of the invention.

DETAILED DESCRIPTION OF THE INVENTION

Generally, the coating according to the invention comprises at least one first layer of paint that is easy to deposit and that has good adhesion to various types of surfaces, covered by a protective resin that withstands attacks of any nature. The advantage of the present invention lies notably in the possibility of being able to easily modify a coating without even having the need to remove a pre-existing coating and this being with a sufficiently small thickness in order not to generate differences in the level of the floor between different rooms, for example, and also under the doors.

In the case, for example, of damaged tiling that it would be advisable to remove, advantageously and according to the invention, it becomes possible to coat it with a decorative paint covered with the resin for protecting said surface. Such a type of coating, due to its fluidity properties, makes it possible to mask all the defects of the old coating and to provide a new coating without prior work of removing material, which may prove long and difficult. The same applies when it is desired to change sanitary ware of wash basin, bath or sink type, which may have defects in the enamel.

According to the invention, firstly a layer of two-component paint is deposited, which has the advantage of being very strong after reaction of the two components together.

According to one variant of the invention the two-component paint comprises a first component of prepolymer type based on bisphenol A and on epichlorohydrin that is capable of forming the following compound according to the following reaction scheme:

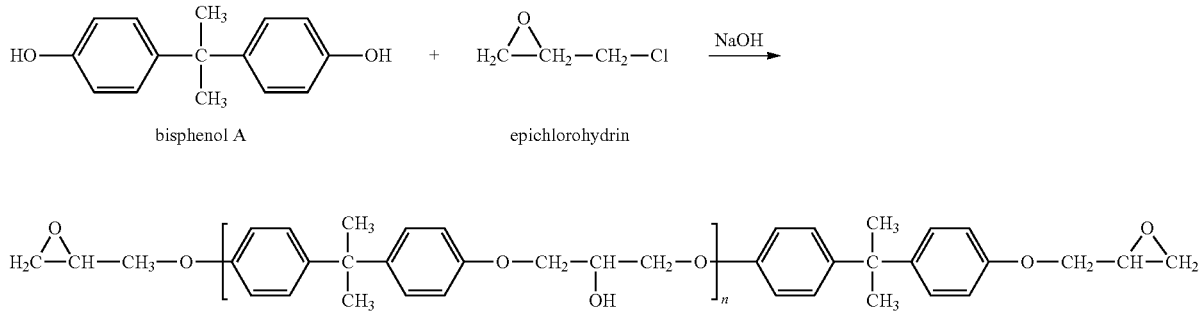

Advantageously, the prepolymer may also be prepared from a mixture of bisphenol A and bisphenol F and epichlorohydrin, the chemical formulae of which are given below:

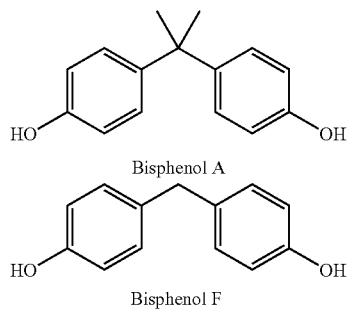

Bisphenol A

Bisphenol F

The advantage of adding bisphenol F lies in the improvement of the adhesion properties which may be obtained in the final paint.

Generally, in the presence of prepolymers, it is advisable to develop bonds between said prepolymers. In order to do this a second component of polyamine type is added, which may react with the terminal bonds of the prepolymers. This is because the electrons of the polyamine attack the carbon atom next to the oxygen of the epoxide, giving a negative charge to the oxygen and a positive charge to the nitrogen.

According to one example of a coating of the invention, the two types of components particularly suitable for the two-component paint are:

a first compound of the type: a mixture of bisphenol A epichlorohydrin and of bisphenol F epichlorohydrin;

a second compound of the polyamine and polyol resin type.

The two components in solvents of 3-butoxy-2-propanol and 1-methoxy-2-propanol type are mixed at the time of use to cover the surface in question. This mixture is, before coating, mixed with water to obtain the desired viscosity. Furthermore, mineral fillers are also added thereto: conventional fillers for obtaining the desired colours and other fillers of the alkali metal silicate type comprising, for example, magnesium or aluminium or else iron, particularly suitable for floor coating applications.

The advantage of these paints relates to their very good resistance which allows them to be used as a coating other than for decoration whereas most paints are used solely for covering walls or ceilings. It has, furthermore, a high adhesion to any type of surface.

Thus a first decorative layer is obtained that has the entire decorative palette desired as a function of the pigments present in said layer and that conventionally has a thickness of around 400 to 500 microns.

When the two-component paint layer is completely dry (typically after around about ten hours), a protective resin layer is then deposited, which thus makes it possible to encapsulate the paint layer and protect the decorative effects.

The protective resin proposed in the present invention has particular properties in terms of resistance and of ease of being able to cover, with great uniformity, numerous surfaces while thus allowing numerous applications.

According to the invention, the resin is advantageously translucent, or even transparent, making it possible to leave the decoration produced previously visible. It may advantageously itself comprise inclusions that reinforce the decorative effects. These inclusions may be of any type: decorative micro-objects for bathroom of sanitary ware elements, inclusions that may be rendered luminous, for floor coating, by addition of luminescent or phosphorescent particles, etc. In this case, the protective resin advantageously has a greater thickness of the order of 1000 microns.

In order to have a high resistance to attacks, whether they are of mechanical or chemical nature, the protective resin of the coating of the invention is advantageously also a two-component resin.

It may typically also comprise a first component of bisphenol A and epichlorohydrin type and a second component of polyamine type. The first component may also advantageously comprise alkyl (C12-C14) glycidyl ether. The solvents used to produce the mixture of said components may typically be of 3-butoxy-2-propanol and of benzyl alcohol type.

According to one variant of the invention, the coating may also comprise an intermediate paint layer, which may advantageously be an acrylic paint. In this case, the two-component paint provides both an adhesion layer and a base which may be clear on which it is possible to produce decorations due to the intermediate paint layer which may be a layer of acrylic paint.

According to this process it is also possible to produce particular decorative effects of the marbled decoration type. In order to do this a certain amount of paint is deposited, which is spread with a spatula, in various directions for example, to obtain the desired marbled effects.

Generally, to produce a coating on a horizontal surface, of floor or worktop type, after depositing the two-component paint layer the protective resin layer is deposited. Typically, the protective resin may be poured then the desired thickness is adjusted using a specific tool of calender roller type. For this, such a roller may have a metal thread, the thread dimensions of which make it possible to adjust the thickness of the resin layer. An example of a roller for depositing this protective resin is illustrated in FIG. 1.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A decorative coating comprising:
   at least one layer of two-component paint, at least one intermediate layer of paint and a protective resin surface layer, said protective resin being translucent or transparent and the two-component paint comprising at least one first component of prepolymer based on bisphenol and epichlorohydrin and at least one second component of polyamine, wherein the protective resin surface layer comprises:
   bisphenol-A-epichlorohydrin;
   3-aminomethyl-3,5,5-trimethylcyclohexylamine;
   alkyl (C12-C14) glycidyl ether;
   3-butoxy-2-propanol;
   benzyl alcohol; and
   pine oil, wherein an amount of pine oil is sufficient to obtain a resin thickness on the order of 400 microns (μm).

2. The decorative coating according to claim 1, wherein the two-component paint has a first component comprising a mixture of bisphenol A and bisphenol F.

3. The decorative coating according to claim 1, wherein the two-component paint also comprises a solvent of 3-butoxy-2-propanol.

4. The decorative coating according to claim 1, wherein the two-component paint also comprises a solvent of 1-methoxy-2-propanol.

5. The decorative coating according to claim 1, wherein the two-component paint also comprises mineral fillers of titanium dioxide and/or of mica and/or of barium sulphate and/or of talc and/or of alkali metal silicate, making it possible to reinforce said paint.

6. The decorative coating according to claim 1, wherein the two-component paint also comprises water.

7. The decorative coating according to claim 1, wherein the two-component paint comprises colouring pigments and the following compounds:
   bisphenol-A-epichlorohydrin;
   bisphenol-F-epichlorohydrin;
   polyamine and polyol resin;
   3-butoxy-2-propanol;
   1-methoxy-2-propanol;
   titanium dioxide;
   alkali metal silicate;
   mica;
   barium sulphate;
   talc; and
   water.

8. The decorative coating according to claim 1, wherein the protective resin also comprises an anti-foaming agent.

9. The decorative coating according to claim 1, wherein the protective resin further comprises particle inclusions.

10. The decorative coating according to claim 1, wherein the protective resin also comprises quartz particles.

11. The decorative coating according to claim 1, wherein the protective resin comprises inclusions.

12. The decorative coating according to claim 11, wherein the inclusions are flake, micro-objects, luminescent particles or phosphorescent particles.

13. The decorative coating according to claim 1, wherein the at least one intermediate layer of paint is acrylic.

14. The decorative coating according to claim 1, wherein the protective resin also comprises satinizing or mattifying particles made of wax particles.

15. A process for producing the decorative coating according to claim 1 on a surface, comprising the following steps:
   depositing the at least one layer of two-component paint on said surface;
   forming the at least one intermediate layer of paint on the at least one layer of two component paint;
   depositing the layer of protective resin on the at least one intermediate layer of paint; and
   adjusting the thickness of the layer of protective resin using a calender roller.

16. The process of claim 15, wherein the calender roller comprises a helical structure of axial symmetry.

17. A process of using the decorative coating according to claim 1 to cover a floor.

18. A process of using the decorative coating according to claim 1 to cover a worktop.

19. A process of using the decorative coating according to claim 1 to cover a sink.

20. A process of using the decorative coating according to claim 1 to cover sanitary ware of wash basin, bath or shower cubicle.

21. A process of using the decorative coating according to claim 1 to cover an electrical household appliance.

* * * * *